Dec. 24, 1963    R. A. ATTON    3,114,984
TRAVELER FOR FISHING LINES
Filed April 25, 1960
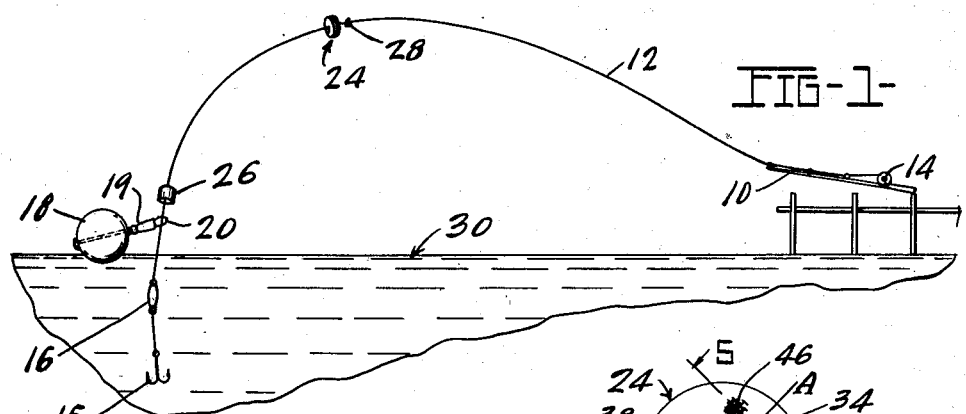
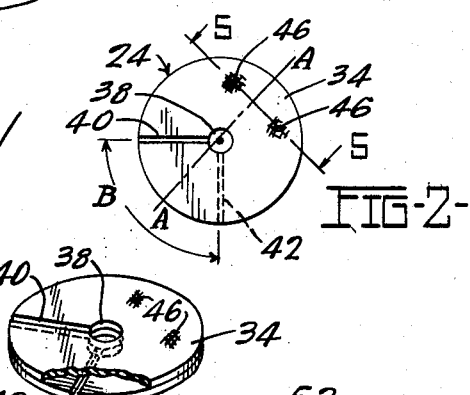
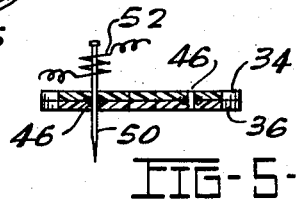
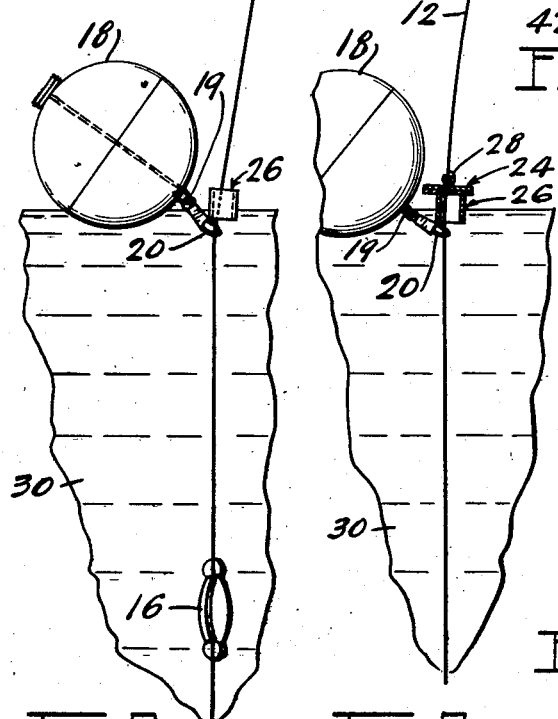
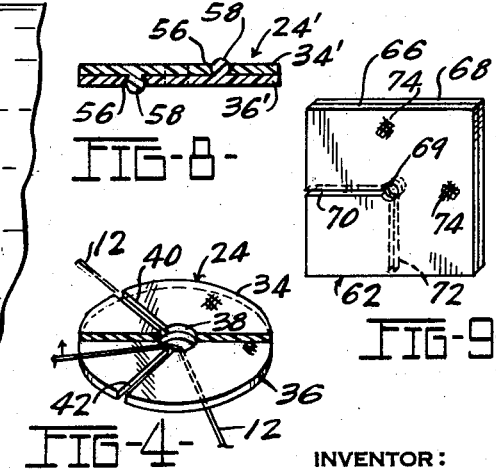
INVENTOR:
ROBERT A. ATTON.
BY
Harry O. Ernsberger
ATTORNEY

United States Patent Office 3,114,984
Patented Dec. 24, 1963

3,114,984
TRAVELER FOR FISHING LINES
Robert A. Atton, 430 Machen St., Toledo 10, Ohio
Filed Apr. 25, 1960, Ser. No. 24,426
10 Claims. (Cl. 43—44.9)

This invention relates to travelers for use with fishing lines and method of fabricating same and more particularly to a traveler or runner which is slidable along a fishing line to enable the fishing equipment to be utilized for various kinds of fishing or angling without effecting changes in the fishing equipment.

It is often desirable to employ a casting line and pole for still fishing purposes and the adaptation of the fishing equipment for such purposes has heretofore necessitated the use of a fishing float provided with particular means as a part of the float engageable with a knot or other abutment in the fishing line to enable the float to be set for a particular depth of still fishing through engagement of a portion of the float with the knot on the line. In the use of fishing float arrangements for this purpose, a minute entrance or opening is provided in the float of a dimension to snugly, yet slidably, accommodate the fishing line, it being imperative that the opening in the float be small enough to prevent the passage of a knot fashioned in the fishing line.

An object of the present invention is the provision of a traveler or runner for use with a fishing line having a knot formed therein for limiting the movement of a fishing float along the line for still fishing purposes yet facilitating the use of the fishing line and equipment for casting purposes.

Another object of the invention is the provision of a traveler or runner arranged to be readily applied to a fishing line at any region of the line and which is usable with any type of fishing float.

Another object of the invention is the provision of a traveler or runner for use with a fishing line which may be readily applied to or removed from the line without impairing the line and which in operative position on the line is adapted for slidable movement thereon without liability of the traveler being inadvertently removed from the line and which is freely slidable along the line whether the latter is wet or dry.

Another object of the invention resides in an arrangement for use with a fishing line enabling the employment of a fishing float of conventional construction which may be used for still fishing operations and retained on the line during casting operations requiring no changes or modifications in the equipment.

Another object of the invention resides in a method of making a traveler for use with a fishing line which may be quickly threaded onto the fishing line or removed therefrom without severing or impairing the line.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a schematic view illustrating the arrangement of the invention in use in a lure casting operation;

FIGURE 2 is an enlarged top plan view of a form of traveler for use with a fishing line;

FIGURE 3 is an isometric view of the traveler, a portion being broken away for purposes of illustration;

FIGURE 4 is an isometric view of the traveler with certain portions broken away to illustrate the method of threading a fishing line through the traveler;

FIGURE 5 is a sectional view taken substantially on the line 5—5 of FIGURE 2 and illustrating a method of securing the components of the traveler in assembled relation;

FIGURE 6 is a schematic view illustrating the relation of float and traveler when the fishing lure is being lowered for still fishing;

FIGURE 7 is a view similar to FIGURE 6 illustrating the traveler of the invention in use as a lure depth limiting means for still fishing;

FIGURE 8 is a sectional view illustrating another means or method for securing components of the traveler in assembled relation, and FIGURE 9 is a plan view illustrating modified form of traveler of the invention.

While the traveler construction of the invention has been illustrated as having particular utility as a slidable component on a fishing line, it is to be understood that the traveler construction may be utilized with any type of flexible line or other linear body wherever the same may be found to have utility.

Referring initially to FIGURE 1 the fishing equipment illustrated includes a fishing rod 10 which may be of the casting rod type, a fishing line 12 stored by a reel 14 mounted upon the rod 10, a fishing lure or hook 15, a weight or sinker 16, and a fishing float 18 of conventional type having a shank or stem 19 provided with a loop or eye 20 adapted to accommodate the fishing line. Mounted for slidable movement upon the fishing line 12 is a traveler or runner 24 of the invention and a comparatively short tube or tubular member 26 which may, in certain instances, be advantageously employed in conjunction with the traveler 24.

A knot 28 may be tied or otherwise fashioned in the fishing line for predetermining the depth of line to be immersed in the body of water 30 when the fishing equipment is used for still fishing.

The construction of the traveler 24 is such that it is readily slidable along the fishing line 12 so as not to impede or interfere with utilization of the fishing equipment for lure casting operations enabling the fishing line to be readily reeled in without interference of the fishing float or obstruction to the passage of the fishing line through the traveler.

One form of the traveler or runner of the invention is illustrated in detail and enlarged in FIGURES 2 through 5. The traveler may be either circular, or polygonal and, if circular, is preferably of a diameter of between three-eighths of an inch and three-quarters of an inch, although other sizes of traveler may be employed if desired.

In the embodiment illustrated in FIGURES 2 through 5, the traveler comprises two substantially identically shaped circular disks or components 34 and 36, each disk being provided with a central or axial opening 38 of a diameter or size to accommodate the fishing line 12 with sufficient clearance such that the traveler is readily slidable along the fishing line. Each disk or component of the traveler is preferably fashioned of a suitable resin or plastic material such as polystyrene, polyethylene or similar material of a thickness to render each disk flexible to an extent that when portions of the disk are secured together, as hereinafter explained, a fishing line may be threaded between regions of the disks in placing or mounting the traveler upon a fishing line or removing the same therefrom.

It is found that the disks may be fashioned from a film or sheet of resin of a thickness of between ten thousandths of an inch and twenty thousandths of an inch, but it is to be understood that other thicknesses of disk may be employed if desired.

The disk 34 is provided with a radial slit, entrance region or passage 40 extending from the periphery of the disk into and in communication with the central opening 38 as shown in FIGURES 2, 3 and 4. The disk 36 is likewise fashioned with a radial slit or entrance opening 42 extending from the periphery of the disk into and in communication with the central opening 38. In assembly, the disks 34 and 36 are secured together and arranged, one with respect to the other, such that the slits 40 and 42 are out of registration and preferably are arranged at an included angle B of about ninety degrees or more as illustrated in FIGURE 2.

The disks 34 and 36 are secured together at a region or regions spaced from the regions of the slits 40 and 42. As shown in FIGURE 2, the disks may be secured together at regions indicated at 46 spaced substantially equal distances at each side of a line bisecting the angle between the slits 40 and 42 and spaced radially from the central opening 38 as shown in FIGURE 2 in order to facilitate slight relative flexure or distortion of each of the disks to admit threading the traveler on a fishing line. The disks may be secured together by heat sealing or heat fusion as the polystyrene or similar resin may be fused at a comparatively low temperature.

FIGURE 5 illustrates one means or method of heat fusing the disks together at the regions 46. As shown in FIGURE 5 a metal needle 50 provided with a resistance heater or coil 52 which is adapted to be heated by flowing electric energy through the coil 52 may be employed for the heat fusing operation. In effecting fusion the heated needle 50 is pierced through the assembled disks, the heat fusing the disks together at the regions 46.

It is to be understood that other methods of securing the disks together at regions 46 of the disks may be employed to secure the disks together. A plastic cement or similar bonding material may be applied to the disks at a region or regions spaced from the slits for securing the disks in assembled relation.

FIGURE 4 is illustrative of the method or operation of threading the fishing line 12 into the central opening 38 of the traveler 24 or removing the line from the traveler. In applying the traveler onto a fishing line, the disks at the regions of the slits 40 and 42 are slightly separated by forcing the fishing line 12 between the disks at the peripheral regions of the disks at the circular sector zone defined by the angle B between the slits. One portion of the fishing line is threaded through the slit 42 inwardly until it enters into the opening 38 in the disk 36.

The portion of the fishing line between the disks is moved in a clockwise direction as viewed in FIGURE 4 between the disks until the portion of the fishing line between the disks registers with the slit 40 and the fishing line moved inwardly through the slit into the opening 38 in the upper disks 34, thus completing a threading of the fishing line into the openings 38. The inherent stress of the material of the disks 34 and 36 tends to maintain their adjacent major planar or flat surfaces in contact as shown in FIGURE 5 so that there is no liability or likelihood of the fishing line 12 reentering either of the slits 40 or 42 until a positive de-threading operation is performed by the user.

The traveler 24 is removed from a fishing line through an inverse series of operations viz. a portion of the line is moved into the slit 40 in the disk 34 and the line then forced between the disks at the region thereof included by the radial angle between the slits, the fishing line then being moved in a counterclockwise direction, as viewed in FIGURE 4, until the portion of the line between the disks enters the slit 42 thereby completing disengaging operations to remove the traveler from the fishing line without impairing or severing the line.

FIGURE 6 is illustrative of the movement of the fishing line as it is being immersed in a body of water for still fishing operations. It will be noted that the traveler 24 is disposed on the fishing line between the connection of the fishing float 18 therewith and the knot or abutment 28 provided in the line. A comparatively short tubular member 26 may if desired be employed and, if used, is disposed between the connection 20 of the float with the line and the traveler 24.

FIGURE 7 illustrates the relative positions of the float 18, the tubular member 26 and the traveler 24 when the fishing line is immersed to the desired depth for still fishing operations. The use of the tubular member 26 serves to space the traveler 24 a short distance from the eye 20 which secures the float 18 upon the fishing line so as to facilitate an angular position of the line with respect to the float 18 and to better accommodate the traveler to various shapes and sizes of float.

From the foregoing it will be apparent that the traveler or runner 24 is readily slidable along the fishing line between the knot 28 and the float 18 when the latter is adjacent the weight 16 or if a weight is not employed, adjacent the lure or hook construction 15. The condition of the fishing line, whether wet or dry, has no appreciable retarding effect upon the slidability of the runner 24 upon the fishing line so that casting operations may be readily carried on as the slidable traveler or runner permits reeling in the fishing line for carrying out lure casting operations.

FIGURE 8 illustrates another means or method of securing the disks together comprising the traveler 24'. In FIGURE 8 the disks 34' and 36' are respectively provided with an opening 56 and a projection 58, each of the openings and projections in the respective disks being arranged for registry as shown in FIGURE 8 whereby the projection 58 on each disk extends into the opening 56 in the adjacent disk.

The openings 56 in the disks are slightly smaller in size than the lateral dimensions of the projections 58 so that the projections are frictionally retained in the openings in the disks. The projections and openings in the disks may be arranged at substantially the regions 46 as the heat sealed bonds 46 shown in FIGURES 2 and 5 so that the zones of the disks adjacent the slits may be distorted or flexed apart to admit the threading of the traveler onto the fishing line in the same manner as described in reference to the method illustrated in FIGURE 4.

FIGURE 9 illustrates another form of traveler of polygonal shape such as a square configuration. The traveler 62 is fashioned of two substantially identically shaped square disks 66 and 68 formed of suitable resin film or plastic such as polystyrene, polyethylene or similar material. The disks 66 and 68 are fashioned with central registering openings 69 to accommodate a fishing line. The disk 66 is formed with a radial slit extending from an edge of the disk into communication with the central opening 69, and the disk 68 provided with a radial slit 72 extending from an edge of disk 68 into communication with the central opening 69.

The square disks are assembled with the slits 70 and 72 arranged preferably at a right angle as shown in FIGURE 9, the disks being secured together at the regions 74 at either side aligned bisecting the right angle between the slits 70 and 72. The disks may be secured together at the regions 74 by heat sealing or fusion in the manner illustrated in FIGURE 5 or the respective disks may be formed with projections and openings as in the arrangement shown in FIGURE 8, or bonded together by cementious material.

In applying the traveler 62 to a fishing line, the line is threaded consecutively through the slit 72, between the region of the disks bounded by the right angle subtended by the slits and through the slit 70 to enter the fishing line into the central registering openings 69 in the disks. Removal of the traveler 62 from the fishing line is accomplished by the series of threading steps in inverse order. The traveler or runner 62, being slidable along a fishing line functions in the same manner as the circular traveler 24 hereinbefore described.

It is to be understood that other shapes of traveler may be employed if desired and the regions of securing the disks of a traveler together may be spaced other than as illustrated herein providing they are disposed at regions which will not interfere with or impair the flexing of the disks at the regions of the slits in order to thread a fishing line into or remove the same from the traveler. It is to be further understood that the disks may be secured together by other means or at a single region provided the bond is effective to prevent relative angular displacement of the disks.

In the forms of traveler illustrated, the slits are arranged substantially at a right angle, but it is to be understood the angle of displacement of the slits may be greater or less than a right angle provided they are with a subtended area permitting flexure of the disks to accomplish the threading of a line into the central opening of the traveler.

It is apparent that, within the scope of the invention, modifications and different arrangements may be made other than as herein disclosed, and the present disclosure is illustrative merely, the invention comprehending all variations thereof.

I claim:

1. A traveler for use with a flexible line comprising sheet-like members formed of flexible material having major surfaces in contiguous relation, each of the members having an opening formed therein, each of said members having a slit formed therein extending from the opening to an edge of the member, said members being arranged with the openings in registration and the slits in displaced relation, said members being permanently secured together at a region spaced from the slits whereby the members may be flexed at the zones adjacent the slits to receive the flexible line.

2. A traveler for use with a flexible line comprising a pair of flat members formed of flexible material having major surfaces in contiguous relation, each of the members having an opening formed therein, each of said members having a slit formed therein extending from the opening to an edge of the member, said members being arranged with the openings in registration and the slits in angularly displaced relation, said members being permanently secured together at a region spaced from the slits whereby the members may be flexed in directions generally normal to their major surfaces at the zones adjacent the slits to accommodate the flexible line.

3. A traveler for use with a flexible line comprising a pair of flat members formed of resinous material having major surfaces in contiguous relation, each of the members having an opening formed therein of a dimension to slidably accommodate the flexible line, each of said members having a slit formed therein extending from the opening to an edge of the member, said members being arranged with the openings in registration and the slits in angularly displaced relation, and means permanently securing the members together at a region spaced from the slits whereby the members may be flexed at a zone adjacent the slits to thread the flexible line through the said zone and through the slits into the registering openings.

4. A traveler for use with a flexible line including a pair of substantially identical flat disks of flexible material, each of said disks being formed with a comparatively small central opening and a slit in communication with said opening and extending to the periphery of the disk, said disks being arranged with the central openings in registration and the slits in angularly displaced relation, and means bonding the disks together at regions spaced from the central openings and sufficiently distant from the slits to admit a flexible line to be threaded between the portions of the disks subtended by the slits.

5. A traveler for use with a flexible line including a pair of flat disks formed of flexible material, each of said disks being formed with a comparatively small central opening and a slit in communication with said opening and extending to the periphery of the disk, said disks being arranged with the central openings in registration and the slits in angularly displaced relation, and means permanently securing the disks together at regions spaced from the central openings and sufficiently distant from the slits whereby the disks may be distorted at the regions of the slits to admit a flexible line to be threaded between the portions of the disks subtended by the slits.

6. A traveler for use with a flexible line comprising a pair of substantially identically shaped disks formed of resinous material and having planar surfaces in contiguous relation, each of said disks being formed with a comparatively small central opening and a radial slit in communication with the central opening and opening at the edge of the disk, said disks being disposed with the small openings in registration and the slits displaced substantially ninety degrees, said disks being permanently secured together in contacting relation at regions spaced from the ninety degree circular sector bounded by the slits.

7. A traveler for use with a fishing line comprising a pair of substantially identically shaped disks formed of resinous material and having planar surfaces in contiguous relation, each of said disks being formed with a comparatively small central opening and a radial passage in communication with the central opening and open at the edge of the disk, said disks being disposed with the small openings in registration and the radial passages displaced substantially ninety degrees, and means permanently securing the disks together in contacting relation at regions spaced from the ninety degree circular sector bounded by the passages.

8. A traveler for use with a fishing line comprising a pair of substantially circularly shaped disks formed of resinous material and having planar surfaces in contiguous relation, each of said disks being formed with a comparatively small opening substantially at the center thereof and a radial slit in communication with the center opening and open at the edge of the disk, said disks being disposed with the center openings in registration and the slits displaced substantially ninety degrees, and means permanently securing the disks together in contacting relation at regions spaced from the ninety degree circular sector defined by the slits.

9. A runner for use with a fishing line comprising a first disk of resinous material having a central circular opening, said first disks formed with a passage extending from the opening to the edge of the disk, a second disk of resinous material having a central circular opening and a passage extending from the opening to the edge of the disk, said disks being disposed with a major surface of each in contiguous relation with the central circular openings in registration to accommodate a fishing line and the passages in the respective disks out of registration, and means bonding the disks together in contacting relation at a region spaced from the passages whereby the regions of the disks adjacent the passages may be flexed to facilitate threading the fishing line between the disks and through the passages into the central openings.

10. A traveler for use with a flexible linear body comprising a first disk of resinous material having a central opening, said first disk formed with a slit extending from the opening to the edge of the disk, a second disk of resinous material having a central opening and a slit extending from the opening to the edge of the disk, said disks being disposed with a major surface of each in contiguous relation with the central openings in registration to accommodate the linear body and with the slits in the respective disks out of alignment, and means at a region of the disks spaced from the slits permanently securing the disks together in contacting relation whereby the regions of the disks adjacent the slits may be flexed to facilitate threading the linear body between the disks and through the slits into the central openings

References Cited in the file of this patent

UNITED STATES PATENTS

| | | |
|---|---|---|
| 691,407 | Pacetty | Jan. 21, 1902 |
| 786,597 | Picken | Apr. 4, 1905 |
| 1,050,748 | Paulsson | Jan. 14, 1913 |
| 2,516,434 | Swan | July 25, 1950 |
| 2,734,303 | Peck et al. | Feb. 14, 1956 |
| 2,740,226 | Arff | Apr. 3, 1956 |
| 2,829,464 | Pettit et al. | Apr. 8, 1958 |
| 2,911,753 | Beckett | Nov. 10, 1959 |